United States Patent [19]

Sugimura

[11] Patent Number: 4,571,341
[45] Date of Patent: Feb. 18, 1986

[54] PROCESS FOR CONTINUOUS RICE COOKING BY STEAMING AND APPARATUS THEREFOR

[76] Inventor: Tsuyoshi Sugimura, 2-4, Azumacho, 2-chome, Ageo-shi, Saitama-ken, Japan

[21] Appl. No.: 634,834

[22] Filed: Jul. 26, 1984

[30] Foreign Application Priority Data

Jul. 27, 1983 [JP] Japan ................................ 58-135785
Dec. 28, 1983 [JP] Japan ................................ 58-248800

[51] Int. Cl.⁴ .......................... A23L 1/10; A23L 3/18
[52] U.S. Cl. ..................................... 426/510; 99/404; 99/443 C; 426/523
[58] Field of Search ............... 426/508, 509, 510, 511, 426/618, 461, 462, 523; 99/339, 443 C, 404

[56] References Cited

U.S. PATENT DOCUMENTS

| 969,238 | 9/1910 | Wright | 426/511 |
| 3,745,019 | 7/1973 | Huxsoll et al. | 426/508 |
| 4,338,344 | 7/1982 | Brooks et al. | 99/404 |

*Primary Examiner*—George Yeung
*Attorney, Agent, or Firm*—Seidel, Gonda, Goldhammer & Abbott

[57] ABSTRACT

A process for continuously cooking rice by steaming comprises the steps of continuously feeding steeped rice into a vertical steamer, promoting the gelatinization of the rice by gradually heating the rice packed in the steamer with jets of steam, cooking and hydrating the heated rice by discharging it from the steamer and passing it through a bath of hot water for heating, transferring the cooked, hydrated rice onto a net conveyor, and then finish-steaming the rice being conveyed by subjecting it to jets of steam.

7 Claims, 1 Drawing Figure

PROCESS FOR CONTINUOUS RICE COOKING BY STEAMING AND APPARATUS THEREFOR

BACKGROUND OF THE INVENTION

1. Field of the Invention

This invention relates to a process for continuously cooking rice as main meal by steaming and also to an apparatus for carrying the process into practice.

2. Description of the Prior Art

Continuous cookers for producing hard cooked rice for koji making by continuous steaming have been in use by brewers and introduced in varied types. As is well known, the hard cooked rice for koji making is hard steamed rice with a low water content. It is not in the least edible but is intended as a medium for developing koji-mold (e.g., Aspergillus oryzae). Continuous cooking by steaming of rice for direct eating has been called for by central kitchens for feeding service, large messhalls, restaurants, and other installations because it will permit a large volume of rice to be cooked very efficiently. To achieve this end, varied attempts have heretofore been made to modify or improve the existing continuous steam cookers for brewers. However, none of the attempts were fruitful and it has been concluded in the art that edible rice cannot be cooked by continuous steaming alone.

Central kitchens, large restaurants and the like have, therefore, adopted the boiling method in which predetermined quantities of rice and water are placed in a large cooking kettle and heated batchwise. Nevertheless, the batch method has shortcomings of large installation space requirement and limited cooking capacity. If a continuous cooking method is to be employed for cooking a large volume of rice, ancillary devices will be necessary for conveying the cooking kettle, scooping out and loosening the cooked rice, and cleansing the kettle. An additional space for storing the kettle will be needed, too. Thus, the necessity of many varieties of ancillary equipment combines with the installation space and cost requirements to render the continuous method very inefficient.

The specification of Japanese Patent Application Publication No. 20931/1956 discloses a continuous rice steam-cooking apparatus based on the same technical idea as the present invention. The reference cooker operates in the following manner. Washed rice from a hopper is placed, in a layer about 1 cm thick, onto an endless wire screen or slat conveyor outside the cooker body. The washed rice on the conveyor is heated with steam in a primary steaming chamber within the cooker body, and then is further heated in a water bath within a decoction chamber. Heating the washed rice on the conveyor by steaming within the cooker body in the manner described is not practical because of serious drawbacks; heating of the washed rice takes much time, the energy efficiency is very low, and a large volume of steam is wasted. The cooker of the cited invention spreads washed rice in a thin layer about 1 cm thick over the conveyor so that it can be heated as rapidly as possible. This, however, makes the energy efficiency even worse, reduces the cooking capacity, and extends the cooking time. Among other disadvantages is the use of a single endless conveyor that necessitates much driving power, or electric power, consumption for the conveyor operation. In addition, the cited invention does not teach the steam temperature for the cooker and, since no automatic cooker of the contiuous steaming type has been practically used in the art, it is unthinkable that the reference cooker should produce glossy, soft, and full cooked rice pleasant to the palate. For the finishing to a tasty meal the steam temperature for finish steaming is a key point.

SUMMARY OF THE INVENTION

Accordingly, the present invention, directed to overcoming the difficulties of the prior art, has for an object to provide a process and an apparatus for continuously cooking rice by steaming whereby a large quantity of tasty rice, cooked soft and full, is continuously obtained in a relatively limited space without the need of ancillary devices.

The object is realized, in accordance with the invention by a process which comprises the steps of continuously feeding steeped rice into a vertical steamer, promoting the gelatinization of the rice by gradually heating the rice packed in the steamer with jets of steam, cooking and hydrating the heated rice by discharging the same from the steamer and passing it through a bath of hot water for heating, transferring the cooked, hydrated rice onto a net conveyor, and then finish-steaming the rice being conveyed by subjecting it to jets of steam. In a preferred embodiment of the invention, the hot water temperature in the step of cooking and hydrating the rice with steam is not lower than 60° C. and the steam temperature for the finish-steaming step is 101° C. or upwards.

The process is best performed by the use of an apparatus for continuously cooking rice by steaming comprising a vertical steamer having steam outlets inside such that steeped rice continuously fed to the vessel is heated for promotion of gelatinization with steam issued from the steam outlets, a hot water tank in which the rice from the steamer is conveyed while being dipped in the bath and thereby cooked and hydrated with heat, a net conveyor for carrying the rice from the hot water tank forward, a finish-steaming chamber including a bank of steam-injecting nozzles beneath the net conveyor and a hood above the conveyor to cook with steam the rice being carried by the net conveyor, steam sources for supplying steams at predetermined temperatures to the steam outlets and nozzles, and means for supplying hot water at a predetermined temperature to the hot water tank.

BRIEF DESCRIPTION OF THE DRAWING

The abovementioned and other objects and advantages of the present invention will be more clearly understood from the following description taken in conjunction with the accompanying drawing showing an embodiment thereof. In the drawing:

The single FIGURE is a schematic side elevational view of an embodiment of the continuous steam-cooking apparatus to which the process of the invention is applicable.

DESCRIPTION OF THE PREFERRED EMBODIMENT

Figure 1:
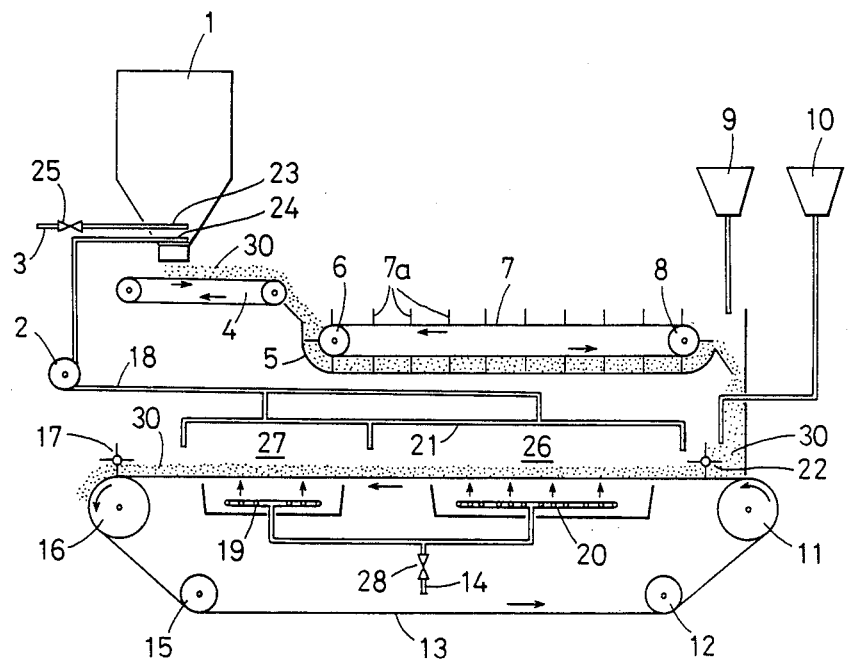

Referring to the drawing, which shows a continuous steam-cooking apparatus embodying the invention, rice steeped and drained off in a preceding station is introduced into a vertical precooker or steamer 1. The rice is continuously fed to the steamer 1 by appropriate means not shown. In the bottom space of the cooker is open an end of a steam injection pipe 23. Steam at a predetermined rate is supplied from a steam source not shown to this injection pipe 23 through a steam line 3 and a valve 25. Also open in the bottom space of the steamer 1 is a waste-steam injection pipe 24. Waste steam from finish-cooking and heat-retaining post-steaming stages to be described later is drawn up by suction via a hood 21 and a waste-steam suction pipe 18 by means of a blower 2. It is then supplied to the waste-steam pipe 24 and injected into the cooker for reuse in rice cooking, thus enhancing the overall energy efficiency. Inside the cooker 1, the rice is heated and cooked with the jets of steam from the injection pipes 23, 24, for example, until the core temperature of individual rice grains reaches around 90° C. This cooking promotes the gelatinization of the rice. Heated and gelatinized in this way, the rice is discharged from the bottom of the cooker 1 onto a rice-discharging conveyor 4. It is leveled to a layer of a given thickness (for example, about 10 cm) and a given width (about 1 m) and conveyed into a hot water tank 5. In this tank is half-immersed a rice-carrying bar conveyor 7 having a number of partition bars 7a held across and spaced a given distance from one another. The bar conveyor is extended between and around a pair of rolls 6 and 8. The tank is supplied with hot water at 60° to 100° C. from a hot water line not shown. The rice-carrying bar conveyor 7 runs endlessly in the directions of the arrows as at least one of the rolls 6 and 8 is driven for rotation. It carries the rice introduced into the hot water tank 5 at a constant rate therethrough and hydrates the rice while heating and cooking it with hot water, for example, at about 90° C. The cooked and hydrated rice is transferred from the tank 5 onto a net conveyor 13, which comprises, as shown, a netting extended around four rolls 11, 12, 15, 16. At least one of these rolls is driven rotationally to cause the net conveyor to run in the directions of the arrows. Rice from the hot water tank 5, fed at a constant rate to the net conveyor 13, is accordingly conveyed by the latter in the form of a layer of substantially uniform thickness and width. It is possible, of course, to provide additional leveling means to ensure the uniformity. Rice on the net conveyor 13 is carried into a finish-steaming chamber 26 equipped with a hood 21, where it is finish-cooked with hot steam at 101° to 120° C. introduced from a steam pipe 20 with a bank of nozzles disposed beneath the net conveyor, and then is sent to a post-steaming chamber 27 under the common hood 21. In the latter, the rice on the net conveyor 13 is thoroughly post-steamed for settling by hot steam from a steam injection pipe 19 disposed beneath the conveyor. The rice thus finished is glossy, soft, full, and tasty. It is then loosened by a bladed roll 17 and discharged to a next station where, for example, it is filled in bowls or other containers for service. The steam injection pipes 19 and 20 are communicated with a steam source not shown through a valve 28 and a steam line 14. The waste steam collected by the hood 21 is drawn up by the blower 2 through the suction pipe 18 and is supplied to the vertical steamer 1 for reuse as part of the energy for steam-cooking the rice.

The rice cooked in accordance with the process of the invention is soft and full, glossy, and not sloppy, including few smashed grains. It is as satisfactory as or even better than that obtained by a home cooker. Such a favorable result is never attainable by the prior art method that depends solely upon continuous steaming.

The soft, full, and tasty rice with high degrees of whiteness and gloss and with practically no smashed grain is ascribable to the process of the invention which comprises steaming rice in the vertical steamer 1 until the core of each grain is heated to about 90° C. so as to promote its gelatinization, passing the rice through a hot water bath at 60° to 100° C., thereby allowing the rice to absorb the hot water smoothly and keeping it from reverting to the ungelatinized state, and finishing the rice in the ensuing finish-steaming step with hot steam at 101° to 120° C. in the finish-steaming chamber 26 equipped with the hood 21. Experiments revealed that, at temperatures below 60° C., the lower the temperature the less the rice grains absorbed the hot water, and reversion to the ungelatinized condition took place, rendering it impossible to cook tasty rice. The hot water temperature as specified herein is the value at atmospheric pressure, and therefore by the "hot water at 100° C." is meant the maximum water temperature at atmospheric pressure. Also, it was experimentally found that controlling the hot water temperature would not produce tasty rice if the boiling was followed by finish-steaming at an adequately low temperature. At steam temperatures below 101° C., it was impossible to obtain the rice most pleasant to the palate, as defined above, which is very white, bright, soft and full, and still tasty when allowed to cool down, with each cooked grain being "soft inside and hard outside", a commonly accepted criterion of tastiness. The upper limit of steam temperature was placed at 120° C. because a further increase in the temperature brought substantially no change to the quality of cooked rice. Moreover, the need of a rather high steam pressure resulted in reduced efficiency.

It should be noted, however, that when the ambient temperature is low, as in a cold district, the temperature inside the rice cooking apparatus tends to be lower than in warmer districts. In that event the steam temperature has to be boosted above the upper limit, for example, to 130° C. at some sacrifice of the efficiency. Thus, while the upper limit of 120° C. is specified above from the efficiency viewpoint, the ceiling has nothing to do with the finished rice condition; in any case, the steam temperature has only to be not lower than 101° C. Since the cooked rice condition can be modified to some extent (for example, to be slightly harder or softer than usual) by adjusting the temperatures of hot water and steam for finishing, the temperatures may be advantageously set depending upon the purposes. Further experiments indicated that, despite the omission of the post-steaming chamber 27, the very white, glossy, soft and full rice, good to the palate, was obtained. This is presumably because the finish-steaming chamber 26 has the hood long enough (in the rice-conveying direction) to allow the rice to settle thoroughly by steaming in the finish-steaming chamber 26. Therefore, the post-steaming chamber 27 may be dispensed with, and according to circumstances the finish-steaming chamber 26 may be elongated at will.

While the embodiment shown is such that the net conveyor 13 is located underneath the rice-carrying bar conveyor 7 and the two conveyors are driven contrariwise, it is alternatively possible, if necessary, to align the net conveyor 13 with the rice-carrying bar conveyor 7 so that they run together in the same direction.

Cooked rice with assorted mixtures like pilaff may be prepared, as desired, by adding appropriate food mixtures, precooked or not, from a feeder 9 shown to the rice being transferred from the hot water tank 5 onto the net conveyor 13 and then mixing the rice with the additional food by means of a stirring wheel 22. Some liquid flavor or seasonings may also be added from a feeder 10 to the rice on the conveyor 13 and mixed with the latter by the stirrer 22 to flavor or season the rice as may be desired. The reference numeral 30 indicates the flow of rice.

As described above, the present invention comprises an utterly novel sequence of steps, that is, of heating steeped and dewatered rice in a vertical steamer and thereby promoting its gelatinization, discharging the steamed rice and conveying it at a predetermined rate into a hot water tank 5 at 60° to 100° C., thereby cooking the rice with heat and water, transferring the rice onto a hooded net conveyor, and then finish- and post-steaming it with steam at 101° C. or upwards. In this way the soft, full, and tasty rice of soft-inside-hard-outside grains has now been successfully made for the first time in the art. The rice is well comparable to or even superior to that obtained by a cooker using continuous steaming alone, and this, in fact, has not been deemed practicable. Under the invention the apparatus can be installed in a relatively limited space, and the continuous steaming system permits a large volume of rice to be cooked within a short time, requiring no special ancillary equipment. Thus, the invention is economically advantageous in that it poses no problem of installation space or limited cooking capacity, with no need of varied accessory devices. The adoption of the vertical steamer and reutilization of waste steam add greatly to the energy efficiency, realizing considerable economy on energy as compared with the conventional batch type or automatic rice cooking systems. Among other advantages is the considerable labor saving made possible by automatic cooking of rice with seasonings or assorted mixtures. With these merits the invention may be advantageously incorporated in central kitchens for catering service, large restaurants, and other eating places with remarkable functions and effects.

The invention further permits cooking of waste, crushed rice that has not been successfully cooked heretofore. Consequently, doughs for such rice cakes as "Sembei" (rice crackers) and "Daifuku-mochi" (rice cakes stuffed with sweet bean jam) that are based on waste rice can be prepared in a most desirable way. It should be obvious to one skilled in the art that, when such a dough is to be made, the equipment therefor will have to be installed adjacent to and downstream of the net conveyor 13.

Although a preferred embodiment of the invention has been described, such description is for illustrative purposes only, and it is to be understood that various modifications and alterations may be made according to the necessity without departing from the spirit of the invention. For example, while the embodiment described above employed the rice-discharging conveyor 4 to transfer the heated rice from the vertical steamer 1 to the hot water tank 5, the conveyor may be omitted so as to feed the hot rice directly from the steamer 1 to the tank 5. The resulting rice will be as soft and full, and as tasty as with the use of the conveyor. In this case feeding the rice to the tank 5 at a constant rate is desirable but the rate is not critical. Also, while the bar conveyor 7 is used to carry the rice from the vertical steamer 1 as dipped in hot water within the tank 5, other means may be resorted to in carrying the charge forward through the bath. When necessary, the rice heating temperature of the vertical steamer 1, construction of the apparatus as a whole, and structures, configurations, lengths, widths, and other factors of the individual conveyors 4, 7, and 13 may, of course, be suitably modified as desired.

What is claimed is:

1. A process for continuously cooking rice by steaming which comprises steps of:
    (a) continuously feeding steeped rice into a vertical steamer;
    (b) promoting the gelatinization of the rice by gradually heating the rice in said steamer with jets of steam;
    (c) cooking and hydrating the heated rice by discharging the heated rice from said steamer and passing it through a bath containing hot water at a temperature of 60° C. to 100° C.;
    (d) transferring the cooked, hydrated rice onto a net conveyor; and
    (e) then finish-steaming the rice being conveyed by the net conveyor by subjecting the cooked, hydrated rice to jets of steam at a temperature of at least 101° C.

2. A process according to claim 1 wherein the finish-steaming step includes subjecting the cooked, hydrated rice being conveyed by the net conveyor with steam from a bank of steam-injecting nozzles disposed beneath the net conveyor.

3. A process according to claim 2 wherein the steam from the steam-injecting nozzles is collected in a hood located above the net conveyor.

4. An apparatus for continuously cooking rice by steaming comprising:
    (a) a vertical steamer having steam outlets directed inside the vertical steamer for providing steam to heat steeped rice continuously fed to the vertical steamer for promotion of the gelatinization thereof with steam issued from said steam outlets;
    (b) means for leveling the steamed rice to a layer of a given thickness and conveying it at a predetermined rate into a hot water bath;
    (c) said hot water bath for cooking and hydrating the leveled rice from said vertical steamer by dipping the rice in water at 60° C. to 100° C. within the bath;
    (d) a net conveyor for carrying the rice from said hot water bath; and
    (e) a finish-steaming chamber including a bank of steam injecting nozzles for cooking with steam at a temperature of at least 101° C. the rice being carried by said net conveyor.

5. An apparatus according to claim 4 wherein the bank of steam-injecting nozzles are disposed beneath the net conveyor.

6. An apparatus according to claim 5 further including a hood located above the net conveyor to collect the steam from the steam-injecting nozzles.

7. An apparatus according to claim 4 further including steam sources for supplying steam at predetermined temperatures to the steam outlets and nozzles, and means for supplying hot water at a predetermined temperature to the hot water bath.

* * * * *